April 9, 1963 T. G. HARE 3,084,902
FAUCET VALVE WITH MULTIPLE SEALS
Filed April 29, 1959

INVENTOR.
TERENCE G. HARE
BY
Barnes, Kisselle, Raisch
& Choate
ATTORNEYS 3,084,902
FAUCET VALVE WITH MULTIPLE SEALS
Terence G. Hare, 17638 Grand River, Detroit, Mich.
Filed Apr. 29, 1959, Ser. No. 809,805
2 Claims. (Cl. 251—88)

This invention relates to valve structures and particularly to a valve structure for faucets wherein the washer is supported by a member rotatably mounted and movable axially to bring the washer into and out of engagement with a valve seat.

In order to provide a longer washer life, it is common practice to support the washer on a member which is rotatably mounted. Such a construction is shown in the recently issued patent to T. G. Hare titled Faucet With Ball Bearing Mounted Seal, No. 2,879,025. Although such valve structures have been very successful and been used quite extensively to reduce the cost of maintenance of faucets, there is still some tendency of damage after a prolonged use due to corrosion caused by the water which has a high mineral content.

It is therefore an object of this invention to provide an improved valve structure which not only includes an arrangement for rotatably mounting the washer but, in addition, prevents the entry of water into the area where damage could be caused.

Figure 1:
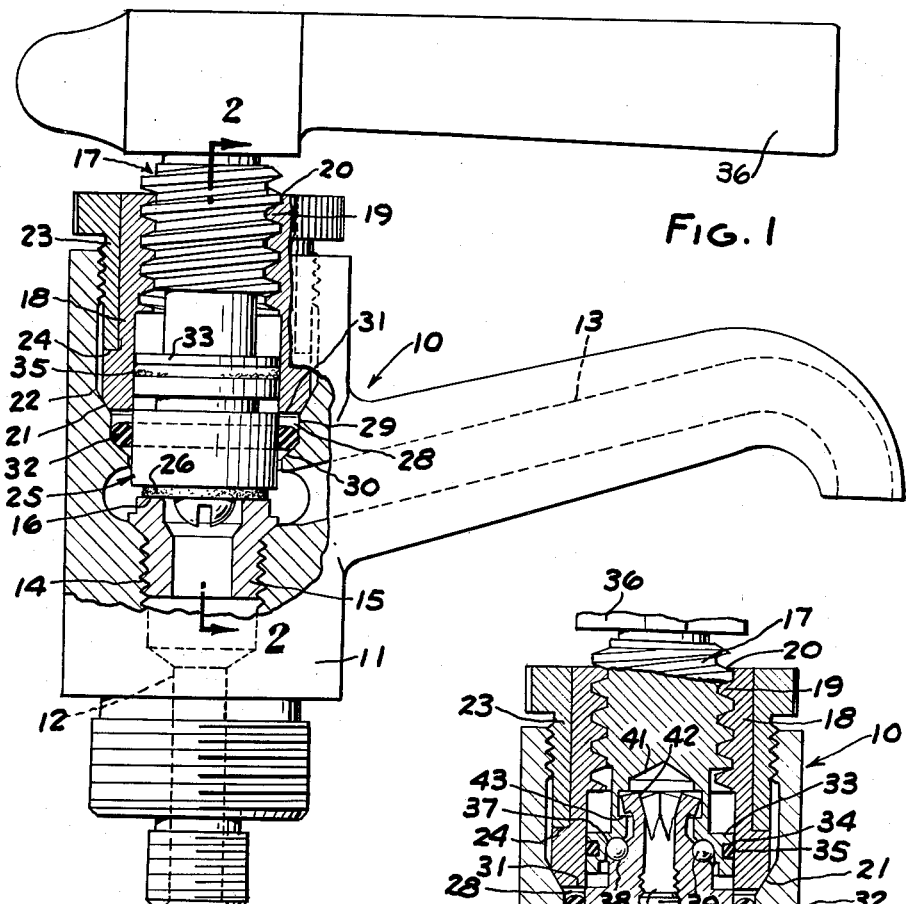
FIG. 1 is an elevation partly in section of a faucet embodying the invention.
Figure 2:
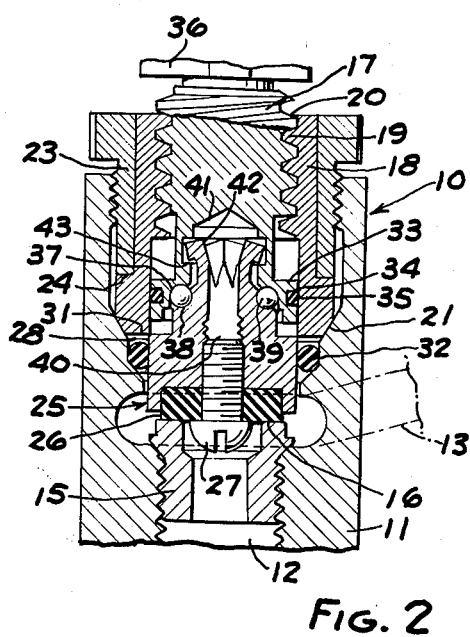
FIG. 2 is a vertical section taken along the line 2—2 in FIG. 1.
Figure 3:
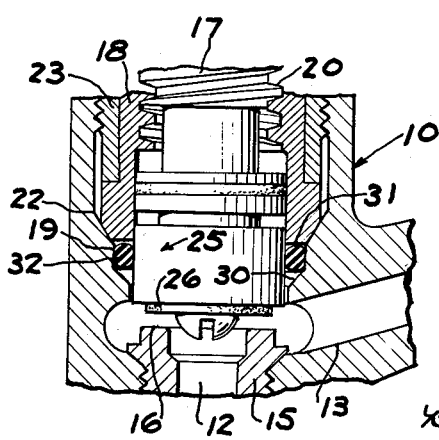
FIG. 3 is a fragmentary view similar to FIG. 1 showing the valve in open position.

Referring to the drawings, the faucet 10 embodying the invention comprises a faucet body 11 having an inlet passage 12 and an outlet passage 13 communicating with the inlet passage 12. The faucet body 11 is formed with internal threads 14 along the inlet passage 12 at the area of juncture of the inlet passage 12 with the outlet passage 13 and a threaded sleeve 15 engages the threads 14 and provides a seat 16 which is engaged by the washer as presently described.

A valve member 17 is mounted for movement toward and away from the seat 16 by an arrangement which includes a sleeve 18 having internal threads 19 engaged by external threads 20 on the upper end of the valve member 17. The lower end of sleeve 18 is formed with a beveled edge 21 which engages a beveled surface 22 in the faucet body 11. Sleeve 18 is held in position by a collar 23 which is threaded into the upper end of the faucet body 11 and engages shoulder 24 on the lower end of the sleeve 18. A washer holder 25 is rotatably mounted on the lower end of the valve member 17 and supports a washer 26 on its lower end. Washer 26 is held in position by a screw 27 passing through the washer and threaded into the lower end of the holder 25.

As shown in the drawings, the outer surface of lower portion of washer holder 25 is cylindrical and the faucet body 11 is provided with a cavity 28 adjacent this surface and defined by surfaces 29, 30 and the lower edge 31 of sleeve 18. An O-ring 32 is positioned in the cavity 28 and provides a liquid-tight seal between the faucet body 11 and the washer holder 25. By this arrangement, water is prevented from moving upwardly past the O-ring 32 into the area between the valve member 17 and the washer holder 25. Accordingly, it is impossible for the water to enter into the area of the structure which rotatably mounts the washer holder 25 on the valve member 17. The distance between surfaces 30, 31 is greater than the diameter of O-ring 32 so that the O-ring 32 has room for limited longitudinal movement relative to the faucet body 11.

In order to prevent movement of the valve member 17 when the valve is closed, that is, when the washer 26 is in engagement with the seat 16, the lower end of valve member 17 is enlarged as at 33 and formed with a groove 34 in the periphery thereof in which an O-ring 35 is positioned which provides friction between the valve member 16 and the faucet body 11 so that there is a tendency to hold the valve member in position.

A handle 36 is provided on the upper end of valve member 17 to serve as a means for grasping and rotating the valve member 17.

The means for rotatably mounting the washer holder 25 on the valve member 17 preferably include ball bearings in order to provide as little friction as possible. As shown in the drawings, the lower end of the valve member 17 is formed with an annular raceway 37 and the upper end of the washer holder 25 is formed with an annular raceway 38 and an annulus of balls 39 is positioned between the raceways. Washer holder 25 has an axial bore 40 extending therethrough and the upper end of the washer holder extends into an opening 41 in the lower end of the valve member 17. The upper end of the holder is formed with a plurality of segments 42 which have their upper ends formed with a radially enlarged cross section connected by a reduced radial cross section. Opening 41 includes an annular shoulder 43. Each segment 42 is permanently deformed beyond its elastic limit and brought into closely adjacent relationship to the shoulder 43 to rotatably mount the washer holder 25 on the lower end of the valve member 17. The specific construction of this means for rotatably mounting the washer holder 25 on the valve member 17 is more completely disclosed in the aforementioned Patent 2,879,025.

Although the specific construction shown and described is preferred, other arrangements or means can be provided for rotatably mounting the washer holder 25 on the valve member 17 although, in any event, it is preferred that ball bearings be used in the mechanism.

By providing a liquid-tight seal between the washer holder 25 and the faucet body 11, below the ball bearings and associated structure which rotatably mounts the washer holder 25 on the valve member 17, water is prevented from passing upwardly into the area of the ball bearings and the resultant corrosion and deterioration is entirely eliminated. The use of the gasket 35 tends to prevent valve holder 17 from rotating and insures that the valve will not be opened by liquid pressure.

Although various materials may be used in manufacturing the faucet, it is preferred that the valve holder 25 be made of silicon bronze which is resistant to dezincification under the action of treated mineral bearing water while the valve member 17 may be made of any other suitable material which need not be so resistant and therefore may be less costly.

I claim:

1. A valve structure comprising a faucet body having an inlet passage and an outlet passage communicating with the inlet passage, said faucet body including a valve seat at the area of juncture of said inlet passage and said outlet passage, said faucet body including an opening intersecting said area of juncture and communicating with the exterior of said faucet body, a sleeve mounted in said opening, the lower end of said sleeve cooperating with a portion of said faucet body to define an annular groove, a valve body, said sleeve and said valve body having complementary threads whereby said valve body is moved toward and away from said seat as it is turned in said threads of said sleeve, said valve body having a cylindrical peripheral surface, said sleeve having an internal cylindrical surface complementary to said cylindrical surface on said valve body, said valve body having an annular groove in said cylindrical surface, an O-ring positioned in said groove and engaging the cylindrical surface on said sleeve thereby tending to prevent rotation between said valve body and said sleeve and providing a liquid-tight seal between said valve body and said sleeve, a washer holder adapted to support a washer, means for rotatably mounting said washer holder on the lower end of said valve body for movement with said valve body toward and away from the valve seat when the valve body is rotated in the sleeve, said washer holder having an exterior cylindrical surface, an O-ring positioned in the groove formed by the lower end of said sleeve and said faucet body and engaging the cylindrical surface on said washer holder thereby providing a liquid-tight seal preventing liquid from entering in the area between said O-ring on said valve body and said O-ring on said washer holder, the axial extent of said groove formed by said sleeve and said faucet body being greater than the diameter of said O-ring positioned in said groove.

2. The combination set forth in claim 1 wherein the diameter of said cylindrical surface on said valve body is substantially equal to the diameter of said cylindrical surface on said washer holder.

References Cited in the file of this patent

UNITED STATES PATENTS

| | | |
|---|---|---|
| 80,066 | Gibson | July 21, 1868 |
| 2,451,928 | Doerr | Oct. 19, 1948 |

FOREIGN PATENTS

| | | |
|---|---|---|
| 2,613 | Great Britain | Sept. 25, 1862 |
| 63,684 | France | Apr. 20, 1955 |
| 557,329 | Belgium | May 31, 1957 |
| 762,380 | Great Britain | Nov. 28, 1956 |